United States Patent Office 3,049,505
Patented Aug. 14, 1962

3,049,505
MECHANICAL BLEND OF A POLYURETHANE RUBBER WITH BLENDS OF A GRAFT COPOLYMER OF POLYBUTADIENE, STYRENE, AND ACRYLONITRILE
Thomas S. Grabowski, Vienna, W. Va., assignor to Borg-Warner Corporation, Chicago, Ill., a corporation of Illinois
No Drawing. Filed Sept. 24, 1958, Ser. No. 762,929
9 Claims. (Cl. 260—45.4)

This invention relates to synthetic polymer blends exhibiting a desirable combination of physical properties. More particularly, this invention relates to synthetic polymer blends exhibiting a desirable combination of physical properties, including a high tear resistance. In one specific aspect thereof this invention relates to synthetic polymer blends of high tear resistance.

Many synthetic polymers exhibit a high degree of environmental stability, showing excellent resistance to degradation by oxygen, ozone and ultra violet light. This outstanding resistance immediately suggests the employment of such polymers, for example, in the form of calendered and suitably embossed sheet, as artificial art "leather" upholstery for automobiles, patio furniture, etc., automobile seat covers, and for similar applications where exposure conditions are particularly severe.

However, synthetic polymers exhibiting a high degree of environmental stability are, practically without exception, decidedly lacking in other characteristics desirable or even necessary if these materials are to be employed in the general fields of application indicated in the previous paragraph. Thus, such synthetic polymers are frequently of low tear resistance. Obviously, because of their low tear resistance, calendered sheets of such synthetic polymers are quite unsatisfactory for use in the applications previously indicated where the material is almost invariably subjected to hard and rough usage.

I have found that blending a polyurethane rubber with a certain class of synthetic polymers produces a blend of high tear resistance without sacrifice of any of the desirable characteristics of the blending components.

One object of this invention is to provide synthetic polymer blends exhibiting improved physical properties.

Another object of this invention is to provide synthetic polymer blends of high tear resistance.

An additional object of this invention is to provide synthetic polymer blends exhibiting a high tear resistance without sacrifice of the desirable physical and chemical properties of the respective blending components employed.

Further objects of this invention will become apparent as the description thereof proceeds.

Within recent years it has become increasingly common practice to prepare polymeric products by the so-called "graft" polymerization technique. As may be determined by reference to the Report on Nomenclature of the International Union of Pure and Applied Chemistry (published in the Journal of Polymer Science, volume 8, page 260, 1952), the term "graft polymerization" is employed to designate the process wherein a polymerizable monomer (or mixture of polymerizable monomers) is reacted, under polymerizing conditions, in the present of a previously formed polymer or copolymer. "A graft copolymer is a high polymer, the molecules of which consist of two or more polymeric parts, of different composition, chemically united together. A graft copolymer may be produced, for example, by polymerization of a given kind of monomer with subsequent polymerization of another kind of monomer onto the product of the first polymerization."

I have found that blends of certain graft copolymers (of a nature described specifically and in detail subsequently) with a polyurethane rubber (of a nature described specifically and in detail subsequently) are characterized by a high tear resistance.

Graft copolymers suitable for use in the production of the blends of this invention may be prepared by the interaction, under polymerizing conditions, of a mixture of a vinyl cyanide and a vinyl aromatic hydrocarbon, exemplified, respectively, by acrylonitrile and styrene, with a conjugated diolefine polymer latex, exemplified by polybutadiene latex. The organic portion of the reaction mixture comprises about 40–80% by weight combined acrylonitrile plus styrene and about 60 to 20 parts by weight (dry basis) polybutadiene. The acrylonitrile preferably comprises from 10–30% by weight of the three component organic mixture (acrylonitrile plus styrene plus polybutadiene) the styrene 30–70% by weight and the polybutadiene, correspondingly 20–60% by weight of the three component mixture.

For the better understanding of this invention the following specific embodiments and details thereof are given but it is to be understood that the embodiments and details set forth below are illustrative only and the spirit and scope of the invention is not in any way limited to such specific embodiments and details thereof.

For the better understanding of this invention the following example sets forth a description of the preparation of a representative graft copolymer suitable for use in forming the new and improved blends of this invention:

*Example 1*

The following recipe (set forth in parts by weight) was employed in forming a graft copolymer suitable for use in producing the blends of this invention:

| | |
|---|---:|
| Polybutadiene latex, polybutadiene equivalent | 30.0 |
| Acrylonitrile | 25.0 |
| Styrene | 45.0 |
| Total | 100.0 |
| Cumene hydroperoxide | 0.75 |
| Sodium salt of hydrogenated disproportionated rosin | 2.0 |
| Sodium pyrophosphate | 0.5 |
| Sodium hydroxide | 0.15 |
| Sodium salt of condensed alkyl naphthalene sulfonic acid | 0.15 |
| Dextrose | 1.0 |
| Ferrous sulfate | 0.01 |
| Water, including water present in the polybutadiene latex | 160.0 |

The above recipe was introduced into a glass reactor which was sealed and tumbled for six hours in a water bath heated to 65–85° C. At the end of this time reaction was essentially complete. The polymeric product formed was recovered as follows: The final reaction mixture was coagulated with dilute brine and sulfuric acid, heated to 95° C. to produce partial granulation of the coagualted product to facilitate subsequent filtration and washing operations, filtered, washed and finally dried to constant weight at 110° C.

Certain physical properties of the graft copolymer prepared as above described are tabulated below:

Notched Izod impact value, ⅛ in. bar, ft. lbs./inch of notch (A.S.T.M. Method D–256) _____ 5.5
Rockwell hardness, R scale (A.S.T.M. Method D–785) _____ 87
Tensile strength, lbs./sq. in. (A.S.T.M. Method D–636) _____ 4500
Elongation, percent _____ 30
Melt index, A1 (note A) _____ 1.5

NOTE A.—A modification of the procedure set forth in A.S.T.M. Method D–1238–52T. This procedure was originally developed for determining the melt index of polyethylene. Broadly and briefly, in this method, the weight in grams of polyethylene that is discharged during a period of three minutes through a standard orifice positioned below a reservoir of the polymer that is at a standard temperature and under a standard pressure is determined. This determination is proportioned to give the grams of polymer discharged during ten minutes which figure is, by definition, the melt index of polyethylene.

Since the thermoplasticity of the blends with which this invention is concerned is not even of the same order of magnitude as that of polyethylene, a considerable modification of the standard conditions and dimensions set forth in A.S.T.M. Method D–1238 had to be made in order to make this general method applicable to the blends with which this invention is concerned. These modifications involved changes in the size of the orifice, the pressure applied to the blend in the reservoir, the reservoir temperature and the like.

As used herein, melt indices designated A1 express the weight in grams of polymer or polymer blend discharged in one minute through an orifice 0.125 inch in diameter and 0.315 inch long from a reservoir 0.373 inch in diameter containing polymer or polymer blend maintained at a temperature of 410° F. and under a pressure produced by a 5664 g. load. Thus, an A1 melt index of 1.5 means that 1.5 g. of polymer were discharged through the orifice in one minute under the conditions named.

The polyurethane rubber component employed in making the blends of this invention is usually prepared by a series of reactions involving, initially, interaction of an organic diisocyanate and an organic dihydroxy compound of moderately high molecular weight. Interaction of an isocyanate group, —N=C=O, with a hydroxyl group produces the

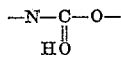

linkage. Since both the diisocyanate and the dihydroxy compound are bifunctional, this initial reaction obviously is capable of producing a linear prepolymer and this actually occurs.

As a rule, a slight stoichiometric excess of the organic diisocyanate over the organic dihydroxy compound is employed in forming the linear prepolymer. Simple heating of such a linear prepolymer containing free isocyanate groups results in the curing of the linear prepolymer, presumably through the formation of cross links between a free isocyanate group on one linear prepolymer molecule and an active hydrogen atom on another linear prepolymer. However, as a rule, such a linear prepolymer containing free isocyanate groups is first treated with a "chain extending agent," that is, a compound containing a plurality of active hydrogen atoms such as water, glycols, diamines, hydroxylamines, and the like, in an amount at least stoichiometrically equivalent to the free isocyanate groups. The resulting cross linked polymer is essentially stable on storage and may be cured, at any desired time, to produce the final polyurethane rubber, by incorporating additional organic diisocyanate into the cross linked polymer and then heating the mixture to bring about cure or vulcanization thereof.

Aromatic diisocyanates are usually employed in the production of the linear prepolymers, such as 1,5-diisocyanato naphthalene, 1,4-diisocyanato benzene, diisocyanato diphenyl methane, particularly, 2,4-tolylene diisocyanate.

The moderately high molecular weight organic dihydroxy compounds used in preparing the linear prepolymers may be polyesters or polyesteramides (with at least a predominance of hydroxyl ends), or polyalkylene ether glycols. Preferably these dihydroxy compounds have a molecular weight of 750 or above, say 1000 to 2500 or higher, up to a molecular weight in the neighborhood of 5000. Among such dihydroxy organic compounds may be mentioned the following:

(1) Polyesters (with at least a predominance of hydroxyl ends) formed by the interaction of aliphatic dicarboxylic acids of four to ten carbon atoms with glycols or polyglycols containing from two to ten carbon atoms. Thus, adipic acid and excess ethylene glycol (or an excess of an ethylene glycol-propylene glycol mixture) may be allowed to interact with the production of a polyester having an average molecular weight of about 1400.

(2) Polyesteramides of molecular weight up to about 5000 prepared by the interaction of an aliphatic dicarboxylic acid, a monoalkanolamine (or an alkyl diamine and glycol, e.g., adipic acid, monoethanolamine and ethylene glycol. Preferably, on the stoichiometric basis, the amount of alkanolamine (or alkyl diamine) is equivalent to half or less of the amount of glycol present so that the ester linkage predominates with only a minor proportion of amide linkages being found in the resulting polyesteramide. The final compound preferably has a predominance of hydroxyl ends.

(3) Polyalkylene ether glycols such as polypropylene glycols and, particularly, polytetramethylene ether glycols having a molecular weight above 750, preferably in the range 2000–4000.

The nature of the "chain extending agents" has been previously indicated. Diisocyanates used in the synthesis of the linear prepolymer may be subsequently employed to cure or vulcanize the cross linked prepolymer although, if desired, different diisocyanates may be used in the initial reaction and for the final curing operation.

If desired, polyurethane elastomers may be prepared using an isocyanate reactant and/or an organic hydroxy reactant having a functionality greater than two. Thus, such trifunctional isocyanates as diphenyl 4,4',-triisocyanate and tri(p-isocyanato phenyl) methane may be employed in the preparation of polyurethane rubbers. Obviously, a mixture of such a trifunctional isocyanate with the stoichiometric amount of even a bifunctional organic dihydroxy compound results in a system capable of rapid reaction with the direct production of three dimensional polymeric products. Among organic polyhydroxy compounds that have a functionality of three or more may be mentioned polyglycerols and modified polyethylene glycols or polyethylene glycol ethers produced by the condensation of a mixture of ethylene glycol and glycerol to produce a hydroxy terminated polyether with a controlled proportion of additional hydroxyl groups distributed along the molecular chain. Again it is evident that a mixture of such an organic polyhydroxy compound with a stoichiometric amount of even a bifunctional diisocyanate results in a system capable of rapid reaction with the direct production of three dimensional polymeric products.

Polyurethane rubbers are now well known commercial products bearing such designations as Adiprene B and Adiprene, Chemigum SL and Vulcollan and the like. These commercial products are prepared in accordance with the procedures outlined in the following paragraphs.

Vulcollan polyurethane, for example, which was developed in Germany during World War II, is prepared from an adipic acid-glycol polyester having a hydroxy number between about 40 to 60. This polyester is preferably chain lengthened with a 40–50% theoretical excess of aromatic diisocyanate such as diisocyanate of pyrene, chrysene, fluorene and especially naphthalene-1,5 diisocyanate and finally cross-linked with water. The polyester preferably has a molecular weight falling in the range of 2000 to 5000. In forming the polyester a mixture of ethylene glycol and propylene glycol in 70:30 ratio may be employed. Typically 14 moles of this glycol mixture is reacted with about 13 moles adipic acid resulting in the formation of a polyester with terminal hydroxyl groups. The excess glycol provides the terminal hydroxyl groups. Vulcollan polyurethane has a molecular weight of about 25,000 to 50,000 (Chemistry of Natural and Synthetic Rubbers, H. L. Fisher, New York, July 1, 1957, pages 149–154; Polyurethanes, Dombrow, New York, October 1957, pages 107 through 113).

Chemigum SL polyurethane is broadly similar to Vulcollan polyurethane with the exception that a deficiency of diisocyanate, preferably an aromatic diisocyanate is employed to chain lengthen the polyester and the final cross-linking operation is accomplished through the use of an additional quantity of diisocyanate. The polyester is made as above described in relation to Vulcollan and is chain lengthened with a molar quantity of 0.70 to 0.99 part theory of an aromatic diisocyanate (as noted with Vulcollan above) and is finally cross-linked by additional diisocyanate. The polyurethane condensation products have molecular weights between about 25,000 and 50,000 (Polyurethanes, Dombrow, New York, October 1957, page 114).

The Adiprene polyurethanes differ from the polyurethane rubbers described above in that the polyester substrate of Vulcollan and Chemigum SL polyurethane is replaced by a hydroxyl group terminated aliphatic polyether (e.g., polyethelene oxide). Aliphatic polyethers are composed by means well known in the art. The polyether is chain lengthened and then cross-linked as usual with the diisocyanate (Chemistry of Natural and Synthetic Rubbers, H. L. Fisher, New York, July 1, 1957, page 148; Polyurethanes, Dombrow, New York, October 1957, pages 107 through 116). While, obviously, the production of polyurethane rubbers forms no part of the present invention, for the better understanding of this invention the preparation of a few representative polyurethane rubbers is briefly set forth below:

Example 2

An ethylene glycol-monoethanolamine-adipic acid polyesteramide of about 5000 molecular weight is heated with the stoichiometric quantity of 1,6-diisocyanato hexane. The resulting linear prepolymer can be cured in the cold with diisocyanato diphenyl methane. While aromatic diisocyanates are preferably employed in the preparation of polyurethane rubbers (mainly because of their high reactivity), this example shows that aliphatic diisocyanates can be used if desired. Also, this example illustrates the use of one diisocyanate to form the linear prepolymer and a different diisocyanate as the curent agent.

Example 3

The linear prepolymer is prepared by the interaction of polyethylene adipate (hydroxyl ends) with an excess of 1,5-diisocyanato naphthalene. The product may be cross linked with water.

Example 4

A cross linked polymer is prepared by the interaction of a mixture of one mole of a polyethylene adipate (hydroxyl ends) of 1400 molecular weight and 0.3 mole water with 1.2 moles, 1,4-diisocyanato benzene for 2.5 hours at 110° C. One hundred parts by weight of the resulting cross linked polymer is mixed with 7.6 parts by weight of 1,5-diisocyanato naphthalene and is heated to produce a cure.

Here, linear prepolymer formation and cross linking occur during a single operation. Also, it is to be noted that different diisocyanates are used in the primary reaction and in the curing operation.

Example 5

A particularly useful polyurethane rubber is made by the interaction of one mole of a polytetremethylene ether glycol of about 3000 average molecular weight with 1.2 moles of 2,4-tolylene diisocyanate. After the linear prepolymer forming reaction is complete a slight excess water (based on the free isocyanate groups present) is added to act as a chain extending agent. One hundred parts by weight of the resulting cross linked polymer is mixed with 9 parts by weight 2,4-tolylene diisocyanate and heated to cure.

The examples to follow present data on the composition and properties of a number of graft copolymer-polyurethane rubber blends prepared in accordance with this invention.

Example 6

The blends of this example contain from 10 to 50 parts by weight polyurethane rubber per 100 parts by weight total blend. Also, with one exception, all these blends contain 10 parts by weight of a finely divided siliceous filler per 100 parts by weight graft copolymer-polyurethane rubber blend, the single exception to this statement being blend No. 5 which contains 50 parts by weight of this filler per 100 parts of the graft copolymer-polyurethane rubber blend.

All blends of this example were prepared by working the components thereof on a mill heated to 320° F. Molded test specimens for determination of certain physical properties were made at a mold temperature of 320° F.

| Blend No. | 1 | 2 | 3 | 4 | 5 |
| --- | --- | --- | --- | --- | --- |
| Polyurethane rubber, Note B | 10 | 20 | 40 | 50 | 50 |
| Graft copolymer (Example 1) | 90 | 80 | 60 | 50 | 50 |
| Total | 100 | 100 | 100 | 100 | 100 |
| Hi Sil 233 (Note C) | 10 | 10 | 10 | 10 | 50 |
| Calcium stearate | 0.5 | 0.5 | 0.5 | 0.5 | 0.5 |
| Tear Resistance, Lbs./in. (A.S.T.M. Method D-1004) | 540 | 550 | 316 | 200 | 270 |
| Tensile Strength, Lbs./sq. inch (A.S.T.M. Method D-638) | 3,375 | 2,750 | 1,295 | 950 | 1,100 |
| Elongation, Percent | 60 | 90 | 80 | 150 | 30 |
| Melt Index A¼ (Note D) | | | 1.8 | 2.8 | |
| Melt Index A1 | | 2.8 | | | |
| Melt Index A3 (Note D) | 0.9 | (8.4) | (21.6) | (33.6) | 0.2 |

NOTE B.—Adiprene C (E. I. du Pont de Nemours and Co.).
NOTE C.—Finely divided siliceous filler. (Columbia-Southern Chemical Corporation.)
NOTE D.—Compare Note A of Example 1. Melt indexes designated A¼, A1 and A3 refer, respectively, to the weight of polymer or polymer blend in grams discharged through the orifice of the previously described test apparatus in 15 seconds, one minute and three minutes. As would be expected the A3 melt index is roughly three times the A1 melt index and twelve times the A¼ melt index. In the above table A3 melt indexes enclosed in parentheses have been calculated from determined A¼ or A1 melt indexes using the appropriate conversion factor just given in this note.

Confining attention for the moment to blends containing 10 parts by weight siliceous filler per 100 parts by weight of the graft copolymer plus polyurethane rubber blend, it will be noted that incorporation of only a relatively minor amount of polyurethane rubber (10–20 parts per 100 parts total blend) into the graft copolymer blending component produces a blend having a very high tear resistance. The tear resistance of the blends of this invention then decrease as the proportion of polyurethane rubber in the blend is increased but even with a 50:50 graft copolymer-polyurethane rubber blend the tear resistance can still be characterized as "good."

The tensile strengths of the blends now being considered decrease continuously as increasing amounts of the polyurethane rubber blending component is incorporated into the blend while the elongation property exhibits the opposite behavior, in general increasing more or less regularly as the polyurethane rubber content of the blend increases.

The melt indexes of these blends show an interesting behavior pattern. As shown previously, the straight graft copolymer blending component has a reasonably high melt index, 1.5 A1, approximately equivalent to 4.5 A3. On incorporating a small amount of polyurethane rubber in this graft copolymer so as to produce a 10:90 blend, the the resulting product exhibits a very low melt index (0.9 A3 actual). However, addition of a second small increment of polyurethane rubber to give a 20:80 polyurethane rubber-graft copolymer blend produces a material of very high melt index and the incorporation of even greater proportions of polyurethane rubber into the graft copolymer gives blends having an enormously high melt index. Since the melt index of a polymer or polymer blend is a good and sufficient criterion of the suitability of the material for use in certain conventional fabrication operations (e.g., injection molding), it is evident that blends may be made in accordance with this invention that range from poor to excellent with respect to their suitability for use in injection molding operations.

While most blends of this example contain 10% by weight finely divided siliceous filler based on the total of the organic components of the blend, blend No. 5 contains 50% of this filler. This additional quantity of filler has more or less the expected effect on physical properties. In comparison with blend No. 4 (10% by weight filler) the high filler blend No. 5 has a somewhat increased tear resistance tensile strength and a greatly decreased elongation and melt index, the melt index of the high filler blend being especially low.

*Example 7*

The accompanying table presents data on two 50:50 graft copolymer-polyurethane rubber blends containing, respectively, 10 and 20 parts by weight finely divided siliceous filler per 100 parts of the organic blend. These compositions were prepared by a somewhat different procedure than was used in making the blends of Example 6. Here, the components of the blends were first milled at 320° F., the mill was then cooled to 200° F. and milling was completed at this lower temperature. It is obvious that this milling procedure results in a more severe physical working of the material than results from milling conducted at 320° F. throughout. Specimens for certain physical testing procedures were prepared from the milled materials of this example by molding them at a comparatively low temperature (250° F.)

| Blend No. | 6 | 7 |
| --- | --- | --- |
| Polyurethane rubber (Note B) | 50 | 50 |
| Graft copolymer of Example 1 | 50 | 50 |
| Total | 100 | 100 |
| Hi Sil 233 (Note C) | 10 | 20 |
| Tear Resistance, Lbs./inch (A.S.T.M. Method D-1004) | 175 | |
| Tensile Strength, Lbs./sq. in. (A.S.T.M. Method D-638) | 950 | 1,010 |
| Elongation, Percent | 670 | 450 |

NOTES B and C.—See Example 6.

The dual temperature milling procedure of the present example produces blends having expected properties with respect to tear resistance and tensile strength. However, the milling procedure of this example produces blends with enormously enhanced elongations in comparison to those exhibited by blends of identical or similar compositions prepared by milling at a constant high temperature of 320° F.

In the blends of this example, increasing the amount of finely divided siliceous filler from 10 parts by weight to 20 parts by weight (based on 100 parts by weight of graft copolymer-polyurethane rubber blend) has effects on physical properties about as would be expected on the basis of previous results. Increasing the proportion of finely divided siliceous filler in the compositions of this example brings about a small increase in tensile strength and a pronounced decrease in elongation.

If desired, blends prepared in accordance with this invention may contain additional components, such as pigments, additional or alternate fillers, stabilizers, plasticizers, and the like, frequently incorporated into polymers and polymer blends in accordance with conventional practices of the art.

While this invention has been described in connection with graft copolymer blending components formed by the interaction, under polymerizing conditions, of a mixture of styrene and acrylonitrile and polybutadiene latex, the invention is not limited to this particular combination of reactants.

The polybutadiene latex may be replaced, in part or entirely, by other conjugated diolefine polymer latices. In the preparation of such other latices the butadiene component may be replaced, in part or entirely, by such conjugated diolefines as isoprene, pentadiene-1,3, the methyl 1,3-pentadienes, dimethyl butadiene-1,3, the 1,3- and 2,4-hexadienes and the like, including mixtures of two or more such conjugated diolefines (including butadiene-1,3).

Likewise, in the preparation of the graft copolymer blending components of this invention, the styrene may be replaced, in part or entirely, by such vinyl aromatic hydrocarbons as alpha methyl styrene, vinyl toluenes, alpha methyl vinyl toluenes and the like, including mixtures of two or more such vinyl aromatic hydrocarbons (including styrene).

Also, if desired, in the preparation of graft copolymer blending components of this invention the acrylonitrile may be replaced, in part or entirely, with other vinyl cyanides such as methacrylonitrile, ethacrylonitrile and the like, including mixtures of two or more such vinyl cyanides (including acrylonitrile).

It has been found that blends of graft copolymers prepared from the wide variety of reactants and in the proportions previously given with polyurethane rubbers (a representative listing of these last having also been given previously) exhibit properties essentially similar to those previously given with respect to the Adiprene C blend with the particular polybutadiene backbone/styrene-acrylonitrile graft copolymer of Example 1.

The general fields of utility of the synthetic polymer blends of this invention are self evident from the previous discussion read in connection with the physical properties of these blends as presented herein. The blends of this invention are particularly adapted for use, in the form of calendered and suitably embossed sheet, as a heavy duty upholstery material for use in automobile and patio furniture upholstery, automobile seat covers, and the like. The blends of this invention exhibit a high resistance to the action of oxygen, ozone, ultra-violet light and similar agencies and in addition to such excellent chemical stability also possess the physical characteristics necessary for utilization in the fields generally indicated above.

Be it remembered, that while this invention has been described in connection with specific details and specific examples thereof, these details and examples are illustrative only and are not to be considered limitations on the spirti or scope of said invention except in so far as these may be incorporated in the appended claims.

I claim:

1. A mechanical blend comprising (1) a cross linked, solid elastomeric reaction product of a polyisocyanate with a material selected from the group consisting of polyesters, polyesteramides and polyalkylene ether glycols and (2) a graft copolymer of an aliphatic conjugated diolefine hydrocarbon polymer, a monovinyl monocyclic aromatic hydrocarbon and a compound selected from the group consisting of acrylonitrile, methacrylonitrile and ethacrylonitrile.

2. A mechanical blend comprising, based on 100 total parts by weight of the named components, from about 10 to about 50 parts by weight of a cross linked, solid elastomeric reaction product of a polyisocyanate with a material selected from the group consisting of polyesters, polyesteramides and polyalkylene ether glycols and from about 90 to about 50 parts by weight of a graft copolymer of an aliphatic conjugated diolefine hydrocarbon polymer, a monovinyl monocyclic aromatic hydrocarbon and a compound selected from the group consisting of acrylonitrile, methacrylonitrile and ethacrylonitrile.

3. A mechanical blend comprising, based on 100 total parts by weight of the named components, from about 10 to about 20 parts by weight of a cross linked, solid elastomeric reaction product of a polyisocyanate with a material selected from the group consisting of polyesters, polyesteramides and polyalkylene ether glycols and from about 90 to about 80 parts by weight of a graft copolymer of an aliphatic conjugated diolefine hydrocarbon polymer, a monovinyl monocyclic aromatic hydrocarbon and a compound selected from the group consisting of acrylonitrile, methacrylonitrile and ethacrylonitrile.

4. A mechanical blend comprising (1) a cross linked, solid elastomeric reaction product of a polyisocyanate with a material selected from the group consisting of polyesters, polyesteramides and polyalkylene ether glycols and (2) a graft copolymer of polybutadiene, a monovinyl monocyclic aromatic hydrocarbon and a compound selected from the group consisting of acrylonitrile, methacrylonitrile and ethacrylonitrile.

5. A mechanical blend comprising, based on 100 total parts by weight of the named components, from about 10 to about 50 parts by weight of a cross linked, solid elastomeric reaction product of a polyisocyanate with a material selected from the group consisting of polyesters, polyesteramides and polyalkylene ether glycols and from about 90 to about 50 parts by weight of a graft copolymer of polybutadiene, a monovinyl monocyclic aromatic hydrocarbon and a compound selected from the group consisting of acrylonitrile, methacrylonitrile and ethacrylonitrile.

6. A mechanical blend comprising, based on 100 total parts by weight of the named components, from about 10 to about 20 parts by weight of a cross linked, solid elastomeric reaction product of a polyisocyanate with a material selected from the group consisting of polyesters, polyesteramides and polyalkylene ether glycols and from about 90 to about 80 parts by weight of a graft copolymer of polybutadiene, a monovinyl monocyclic aromatic hydrocarbon and a compound selected from the group consisting of acrylonitrile, methacrylonitrile and ethacrylonitrile.

7. A mechanical blend comprising (1) a cross linked, solid elastomeric reaction product of a polyisocyanate with a material selected from the group consisting of polyesters, polyesteramides and polyalkylene ether glycols and (2) a graft copolymer of polybutadiene, styrene and acrylonitrile.

8. A mechanical blend comprising, based on 100 total parts by weight of the named components, from about 10 to about 50 parts by weight of a cross linked, solid elastomeric reaction product of a polyisocyanate with a material selected from the group consisting of polyesters, polyesteramides and polyalkylene ether glycols and from about 90 to about 50 parts by weight of a graft copolymer of polybutadiene, styrene and acrylonitrile.

9. A mechanical blend comprising, based on 100 total parts by weight of the named components, from about 10 to about 20 parts by weight of a cross linked, solid elastomeric reaction product of a polyisocyanate with a material selected from the group consisting of polyesters, polyesteramides and polyalkylene ether glycols and from about 90 to about 80 parts by weight of a graft copolymer of polybutadiene, styrene and acrylonitrile.

References Cited in the file of this patent

UNITED STATES PATENTS

| | | |
|---|---|---|
| 2,694,692 | Amos et al. | Nov. 16, 1954 |
| 2,802,808 | Hayes | Aug. 13, 1957 |
| 2,820,773 | Childers et al. | Jan. 21, 1958 |
| 2,851,436 | Forsythe | Sept. 9, 1958 |
| 2,862,907 | Stein et al. | Dec. 2, 1958 |
| 2,884,402 | Bachmann et al. | Apr. 28, 1959 |
| 2,905,582 | Coleman et al. | Sept. 22, 1959 |
| 2,905,652 | Best et al. | Sept. 22, 1959 |
| 2,908,661 | Calvert | Oct. 31, 1959 |

FOREIGN PATENTS

| | | |
|---|---|---|
| 644,829 | Great Britain | Oct. 18, 1950 |
| 649,928 | Great Britain | Feb. 7, 1951 |

UNITED STATES PATENT OFFICE
CERTIFICATE OF CORRECTION

Patent No. 3,049,505                                                 August 14, 1962

Thomas S. Grabowski

It is hereby certified that error appears in the above numbered patent requiring correction and that the said Letters Patent should read as corrected below.

Column 4, lines 42 and 43, for "4,4',-triisocyanate" read -- 4,4',6-triisocyanate --; column 5, line 52, for "curent" read -- curing --; column 8, line 59, for "spirti" read -- spirit --.

Signed and sealed this 4th day of December 1962.

SEAL)
Attest:

RNEST W. SWIDER                                               DAVID L. LADD
ttesting Officer                                                Commissioner of Patents